(12) United States Patent
Rane et al.

(10) Patent No.: US 8,270,463 B1
(45) Date of Patent: Sep. 18, 2012

(54) SYSTEM AND METHOD FOR ADAPTIVELY EQUALIZING DATA SIGNALS WITH HIGHER AND LOWER DATA RATES

(75) Inventors: Amit Rane, Santa Clara, CA (US); Nicolas Nodenot, Villeneuve-Loubet (FR); Yongseon Koh, Palo Alto, CA (US); Laurence Lewicki, Menlo Park, CA (US); Benjamin Buchanan, Suwanee, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 13/228,249

(22) Filed: Sep. 8, 2011

Related U.S. Application Data

(62) Division of application No. 13/183,932, filed on Jul. 15, 2011.

(51) Int. Cl.
*H03H 7/30* (2006.01)

(52) U.S. Cl. ........ 375/232; 375/316; 375/326; 375/229; 455/41.2

(58) Field of Classification Search .................... 375/232
See application file for complete search history.

(56) References Cited

U.S. PATENT DOCUMENTS

| | | | |
|---|---|---|---|
| 5,337,025 A | 8/1994 | Polhemus | |
| 5,442,582 A * | 8/1995 | Lange et al. ................ | 708/819 |
| 5,841,810 A | 11/1998 | Wong et al. | |
| 5,880,645 A | 3/1999 | Everitt et al. | |
| 5,978,417 A * | 11/1999 | Baker et al. ................ | 375/232 |
| 6,137,832 A | 10/2000 | Lin et al. | |
| 6,304,615 B1 | 10/2001 | Webster | |
| 6,363,111 B1 | 3/2002 | Hee et al. | |
| 6,956,914 B2 | 10/2005 | Sivadas et al. | |
| 7,065,134 B2 | 6/2006 | Papanikolaou et al. | |
| 7,180,963 B2 | 2/2007 | Wang et al. | |
| 7,301,997 B1 | 11/2007 | Wang et al. | |
| RE40,038 E | 1/2008 | Shakiba | |
| 7,496,161 B2 | 2/2009 | Chou et al. | |
| 7,633,354 B2 | 12/2009 | Kuijk et al. | |
| 7,656,248 B2 | 2/2010 | Wang | |
| 7,688,887 B2 | 3/2010 | Gupta et al. | |
| 7,760,799 B2 * | 7/2010 | Lai et al. ................ | 375/233 |
| 2003/0231708 A1 * | 12/2003 | Kim et al. ................ | 375/232 |
| 2005/0271173 A1 | 12/2005 | Chou et al. | |
| 2008/0198913 A1 | 8/2008 | Fan et al. | |
| 2009/0296801 A1 * | 12/2009 | Ibrahim et al. ........... | 375/232 |
| 2010/0079216 A1 | 4/2010 | Sakano | |
| 2010/0124265 A1 | 5/2010 | Shakiba et al. | |

OTHER PUBLICATIONS

WIPO International Search Report and Written Opinion, PCT/US2011/044218, mailed Mar. 19, 2012; 9 pages.
Gondi, et al. "A 10-Gb/s CMOS Merged Adaptive Equalizer/CDR Circuit for Serial-Link Receivers" 2006 IEEE, 2 pages.

* cited by examiner

*Primary Examiner* — Lihong Yu
(74) *Attorney, Agent, or Firm* — Eugene C. Conser; Wade J. Brady, III; Frederick J. Telecky, Jr.

(57) ABSTRACT

System and method for adaptive signal equalizing in which overlapping data signal equalization paths provide cumulative data signal equalization to provide multiple equalized data signals having different available amounts of equalization. Signal slicing circuitry slices the equalized data signals to provide multiple sliced data signals, from which the sliced data signal selected as an output data signal is dependent upon the data rate of the incoming data signal.

18 Claims, 7 Drawing Sheets

SYSTEM AND METHOD FOR ADAPTIVELY EQUALIZING DATA SIGNALS WITH HIGHER AND LOWER DATA RATES

RELATED APPLICATION DATA

This application is a divisional of U.S. patent application Ser. No. 13/183,932, filed Jul. 15, 2011.

BACKGROUND

1. Field of the Invention

The present invention relates to interface circuits for receiving high data rate signals from long lengths of cable, and in particular, interface circuits for receiving high data rate, baseband, binary encoded data signals from long lengths of cable.

2. Description of the Related Art

In a typical high speed digital wire-line communication system, the channel introduces frequency dependent loss. These losses cause inter-symbol interference (ISI) when the channel is conveying a random data pattern. An equalizer removes the ISI by implementing the inverse channel response that compensates for the signal distortion caused by the channel. An adaptive equalizer automatically compensates for the loss of the channel.

Recovering data which has been transmitted over a long length of cable at high rates requires that such data be equalized in order to compensate for the loss and phase dispersion of the cable. Further, in those applications where the cable length may vary, such equalization must be based upon a complementary transfer function which is capable of adapting accordingly since the transfer function of the cable varies with the length of the cable. This equalizing is generally done using three functions: a filter function; a dc restoration and slicing function; and an adaptation control, or servo, function.

The filter function is performed using a complementary (with respect to the complex cable loss characteristic) filter which synthesizes the inverse of the transfer function of the cable. Since the bit error rate (BER) is directly related to jitter, an important performance metric for an equalizer is jitter within the output waveform. The extent to which the equalizer is able to match the inverse of the complex cable loss characteristic determines the extent to which inter-symbol interference induced jitter is eliminated.

Conventional equalizers use gm/C types of continuous time filters or finite impulse response (FIR) filters. However, these types of filter structures tend to be complex and have difficulty maintaining the required balance among the desired operating characteristics, such as output jitter, compensation for process and temperature variations, and optimization of the signal-to-noise ratio (SNR).

DETAILED DESCRIPTION

Figure 1:
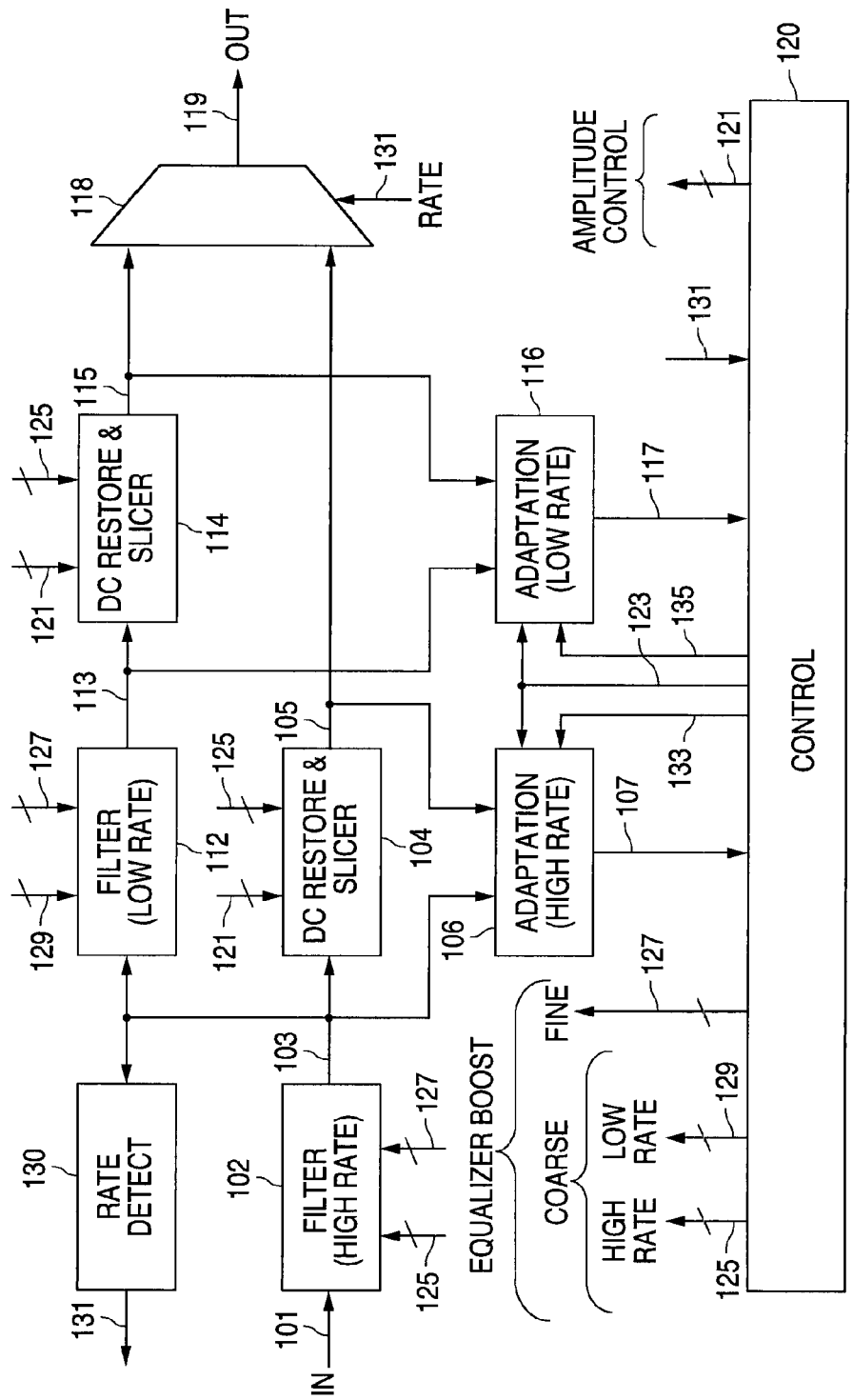
FIG. 1 is a functional block diagram of an adaptive signal equalizer in accordance with a preferred embodiment.

The following detailed description is of example embodiments with references to the accompanying drawings. Such description is intended to be illustrative and not limiting with respect to the scope of all possible embodiments. Such embodiments are described in sufficient detail to enable one of ordinary skill in the art to practice them, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

An adaptive signal equalizer in accordance with one or more preferred embodiments includes one or more of a number of features. Adaptive equalization can be provided with separate equalization boost and amplitude control loops. Adaptive equalization can also be provided with different equalization characteristics depending upon whether a higher or lower data rate is received. Adaptive equalization can be further provided using an initial binary search to reduce the number of necessary data points to be analyzed before reaching the desired equalization, and may include an initial equalization setting (e.g., based on control data stored in a lookup table). The equalization circuit architecture includes coarse control, and may also include fine control, along with means for controlling the transition between coarse and fine adjustments in the equalization.

Adaptation of the equalization is based on interlaced successive approximation of digital boost and amplitude codes. Energy detection points are separated for high data rate and low data rate equalization paths. Different filter bandwidths are used for adaption based on high and low data rates. Boost-dependant amplitude calibration provides a higher calibration range. Power consumption and thermal noise are reduced in the equalization data paths compared to conventional analog adaptation techniques. Further power consumption and thermal noise reductions are achieved by avoiding the use of an automatic gain control (AGC) stage for DC amplitude calibration. Interactions between the amplitude and equalization boost control loops and deadlock are reduced. Linear equalization is segmented to allow for optimal equalization for multiple channels. Both coarse and fine equalization boosts are provided, with appropriate timing when transitioning between coarse and fine adjustments and when increasing or decreasing the digital boost codes. Data rate detection is provided to differentiate between high (e.g., 1.485 Gbps) and low (e.g., 270 Mbps) data rates, with such rate detection used to control the adaptation algorithm. Separate filter bandwidths for high and low data rate paths minimize crosstalk and improve noise performance independently.

Referring to FIG. 1, an adaptive signal equalizer 100 in accordance with one embodiment includes multiple stages interconnecting and interacting substantially as shown: a high (data) rate filter stage 102, a high rate DC restoration and slicing stage 104, a high rate adaptation stage 106, a low (data) rate filter stage, 112, a low rate DC restoration and slicing stage 114, a low rate adaptation stage 116, a signal multiplexor 118, a rate detection stage 130 and a control stage 120. As discussed in more detail below, high data rate signals are processed by the high rate filter 102, high rate DC restoration and slicer 104 and high rate adaptation 107 stages, while low data rate signals are processed by the low rate filter 112, low rate DC restoration and slicer 114 and low rate adaptation 116 stages (e.g., with the high rate filter stage 102 set for less equalization or unity signal gain with no equalization). In accordance with a rate detection signal 131 (which is indicative of whether the incoming signal 101 has a high or low data rate), the multiplexor 118 provides the equalized high 105 or low 115 data signal as the equalized output signal 119.

The high rate filter stage 102 provides controllable amounts of equalization in accordance with high rate coarse 125 and fine 127 control signals. The resulting equalized signal 103 is DC-restored and sliced by the DC restoration and slicer stage 104 in accordance with an amplitude control signal 121 (discussed in more detail below).

This equalized signal 103 is further equalized by the low rate filter 112 in accordance with low rate coarse 129 and fine 127 equalization control signals (discussed in more detail below). The resulting equalized signal 113 is DC-restored by the DC restoration and slicer stage 114 in accordance with the amplitude control signal 121.

The first equalized signal 103 is also used by the rate detection stage 130 to determine whether the incoming signal 101, as represented by the first equalized signal 103, has a high data rate or a low data rate. Its output signal 131 is indicative of the data rate (e.g., high or low).

One of the DC-restored and sliced signals 105, 115 is selected by the multiplexor 118, in accordance with the rate detection signal 131, as the equalized output signal 119. For example, if the rate detection signal 131 is indicative of an input signal 101 having a high data rate, the high rate equalized signal 105 is selected. Conversely, if the rate detection signal 131 is indicative of the incoming signal 101 having a low data rate, the low rate equalized signal 115 is selected.

The high rate adaptation stage 106 processes the equalized input signal 103 and DC-restored and sliced signal 105 of the first DC-restoration and slicer stage 104 to provide a feedback signal 107 to the control stage 120 (discussed in more detail below). Similarly, the low rate adaptation stage 116 processes the low rate equalized signal 113 and DC-restored and sliced signal 115 of the second DC restoration and slicer stage 114 to provide another feedback signal 117 to the control stage 120 (discussed in more detail below).

As discussed in more detail below, the control stage 120 receives and processes the adaptation feedback signals 107, 117 and rate detection signal 131 to provide the amplitude control signal 121, a reset signal 123 and equalizer boost control signals 125, 127, 129.

Figure 2:
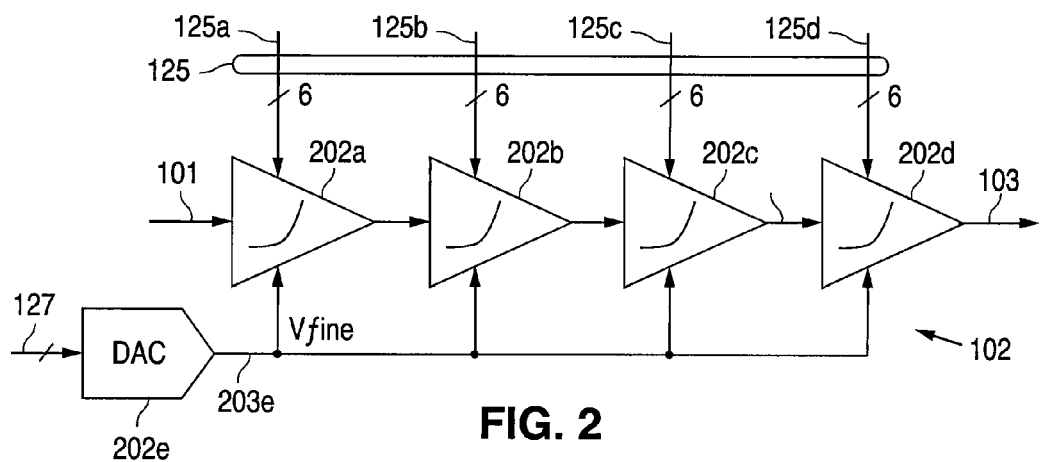
FIG. 2 is a functional block diagram of an exemplary embodiment of the high rate filter of FIG. 1.

Referring to FIG. 2, an exemplary embodiment of the high rate filter stage 102 includes four equalizer circuits 202a, 202b, 202c, 202d and a digital-analog converter (DAC) 202e, interconnected substantially as shown. The incoming signal 101 is successively equalized by each equalizer circuit 202a, 202b, 202c, 202d to produce the first equalized signal 103. Each equalizer circuit 202a, 202b, 202c, 202d is controlled in accordance with a respective subset 125a, 125b, 125c, 125d of the high rate coarse equalization control signal 125. In this exemplary embodiment, the 24-bit control signal 125 is split into four respective 6-bit control signals. The fine equalization control signal 127 is converted by the DAC 202e to an analog control voltage Vfine 203e for fine tuning the equalization performed by each equalization circuit 202a, 202b, 202c, 202d (discussed in more detail below).

In accordance with a preferred embodiment, these four equalizer circuits 202a, 202b, 202c, 202d provide a total of 60 dB of maximum boost (e.g., 15 dB per circuit), using six coarse steps corresponding to 2.5 dB boost per step, and 32 fine steps, thereby providing a resolution of 0.08 dB. The coarse boost control signal 125 use a thermometer code, so the fine boost signal 127 can be shared across all equalizer circuits 202a, 202b, 202c, 202d, i.e., as the converted analog control voltage 203e.

Figure 3:
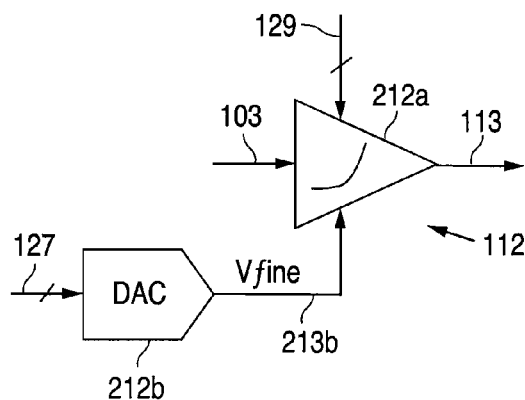
FIG. 3 is a functional block diagram of an exemplary embodiment of the low rate filter of FIG. 1.

Referring to FIG. 3, an exemplary embodiment of the low rate filter stage 112 includes an equalization circuit 212a and a DAC 212b, interconnected substantially as shown. The first equalized signal 103 is further equalized by the equalization circuit 212a to produce the second equalized signal 113. Coarse adjustment of the equalization is in accordance with the low rate coarse control signal 129, while fine adjustment of the equalization is done in accordance with an analog control voltage 213b provided by the DAC 212b based on the fine control signal 127.

This equalizer circuit 212a includes seven internal stages (discussed in more detail below), resulting in seven coarse steps, each of which is further divided into 32 fine steps. As with the high rate filter stage 102, the coarse boost follows a thermometer code, so the fine boost lines can all be driven by the same analog control signal 213b.

Accordingly, in accordance with a preferred embodiment, the four stages of equalization within the high rate filter 102 provides 768 fine steps (6*32*4=768), and the low rate filter stage 112 provides 224 fine steps (7*32=234), resulting in a total of 992 fine steps.

Figure 4:
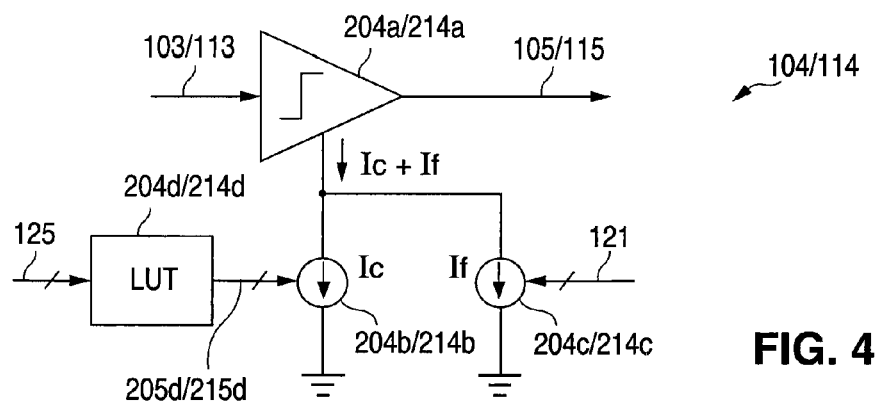
FIG. 4 is a functional block diagram of an exemplary embodiment of the DC restoration and slicer stages of FIG. 1.

Referring to FIG. 4, an exemplary embodiment of circuitry to implement the DC restoration and slicer stages 104, 114 includes respective ones of a slicer circuit 204a/214a, a bias current source 204b/214b for coarse control, a bias current source 204c/214c (e.g., implemented as current DACs) for fine current control, and a lookup table (LUT) 204d/214d, all interconnected substantially as shown. As discussed above, the input signal 103/113 is DC-restored and sliced by the slicer circuit 204a/214a to provide the DC-restored and sliced signal 105/115. Amplitude control of the output signal 105/115 is achieved by controlling the coarse Ic and fine If bias currents in accordance with the coarse boost control signal 125 that addresses LUT current control data 205d/215d, and fine amplitude control signal 121. respectively. During low data rate equalization, the fine amplitude control signal 121 is held constant.

Figure 5:
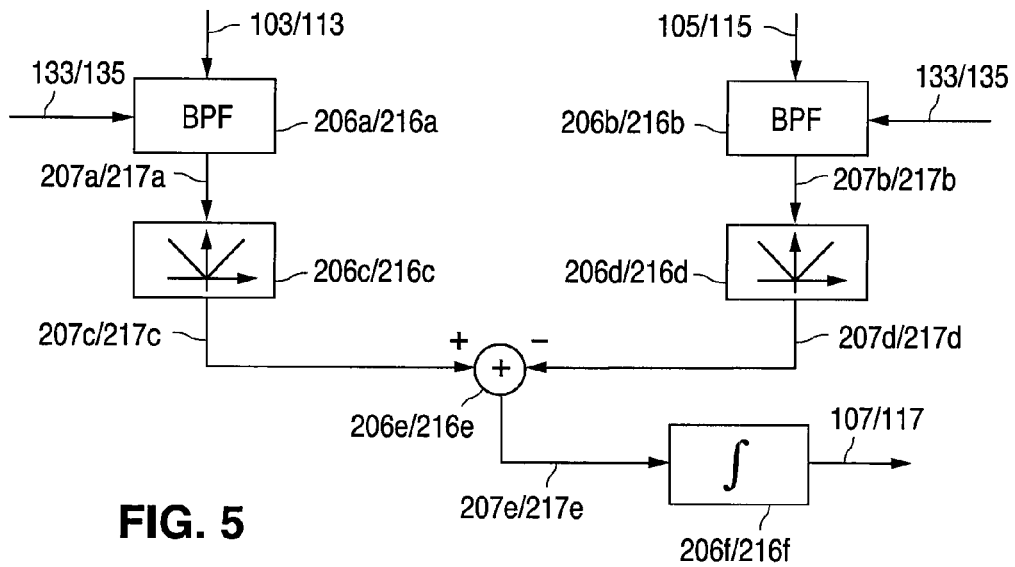
FIG. 5 is a functional block diagram of an exemplary embodiment of the adaptation stages of FIG. 1.

Referring to FIG. 5, an exemplary embodiment of the adaptation stages 106, 116 includes band pass filters 206a/216a, 206b/216b, full wave rectification circuits 206c/216c, 206c/216d, signal summing circuitry 206e/216e, and integration circuitry 206f/216f, interconnected substantially as shown. The input 103/113 and output 105/115 signals of the DC restoration and slicer stage 104/114 are filtered by respective band pass filters 206a/216a, 206b/216b. As discussed in more detail below, each filter 206a/216a, 206b/216b has multiple available bandwidths (e.g., two), one of which is selected in accordance with a bandwidth control signal 133/135. The filtered signals 207a/217a, 207b/217b are full-wave rectified by the rectification circuits 206c/216c, 206d/216d. The summing circuitry 206e/216e is used to find the difference between these rectified signals 207c/217c, 207d/217d, with the resulting difference signal 207e/217e being integrated by the integration circuitry 206f/216f to provide the adaptation feedback signal 107/117.

Figure 6:
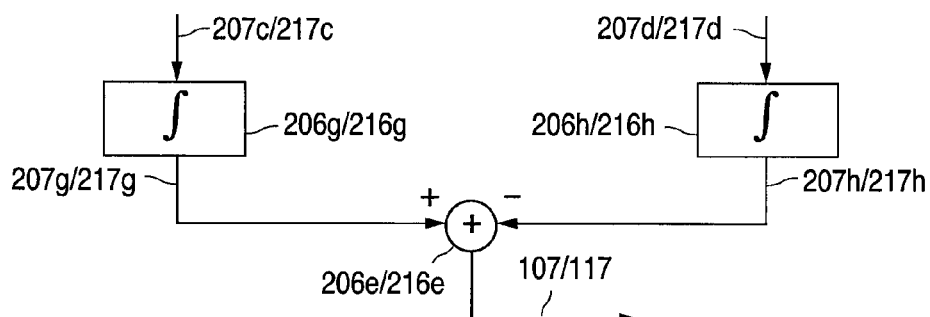
FIG. 6 is a functional block diagram of an alternative embodiment of the integration and summing stages of FIG. 5.

Referring to FIG. 6, in accordance with an alternative embodiment, the ordering of the subtraction and integration of the rectified signals 207c/217c, 207d/217d can be reversed, as shown, with the rectified signals 207c/217c, 207d/217d first being integrated and then subtracted to provide the adaptation feedback signals 107/117.

Figure 7:
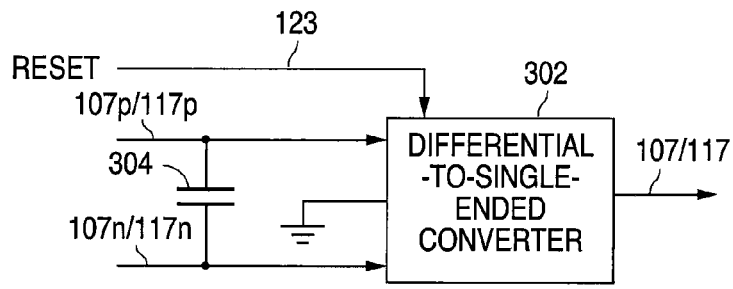
FIG. 7 is a functional block diagram of an exemplary embodiment of a signal conversion stage for use as part of the adaptation stages of FIG. 1.

Referring to FIG. 7, in accordance with a preferred embodiment, the circuitry of FIG. 1 is implemented as differential circuitry with differential signals. Accordingly, the adaptation feedback signals 107, 117 include respective positive 107p, 117p and negative 107n, 117n signal phases which are converted by a differential-to-single-ended conversion circuit 302 when applied across an automatic equalization control (AEC) capacitance 304 to produce a single-ended adaptation feedback signal 107/117. The reset signal 123 controls resetting of the accumulated charge across the AEC capacitance 304 (discussed in more detail below).

Figure 8:
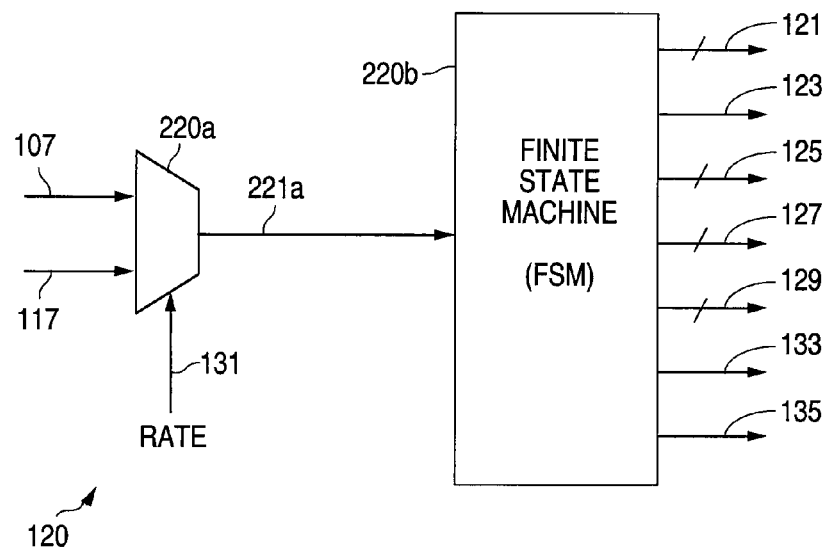
FIG. 8 is a functional block diagram of an exemplary embodiment of the control stage of FIG. 1.

Referring to FIG. 8, an exemplary embodiment of the control stage 120 includes a multiplexor 220a and a finite state machine (FSM) 220b, interconnected substantially as shown. Depending upon whether the input signal 101 is identified by the rate detection signal 131 as having a high or low data rate, the multiplexor 220a selects either the high 107 or low 117 rate adaptation feedback signal as the signal 221a to be provided to the FSM 220b. In accordance with the selected adaptation feedback signal 221a, the a FSM 220b provides the amplitude control signal 121, reset signal 123 and equalizer boost control signals 125, 127, 129, and adaptation filter control signals 133, 135 (discussed in more detail below).

Figure 9:
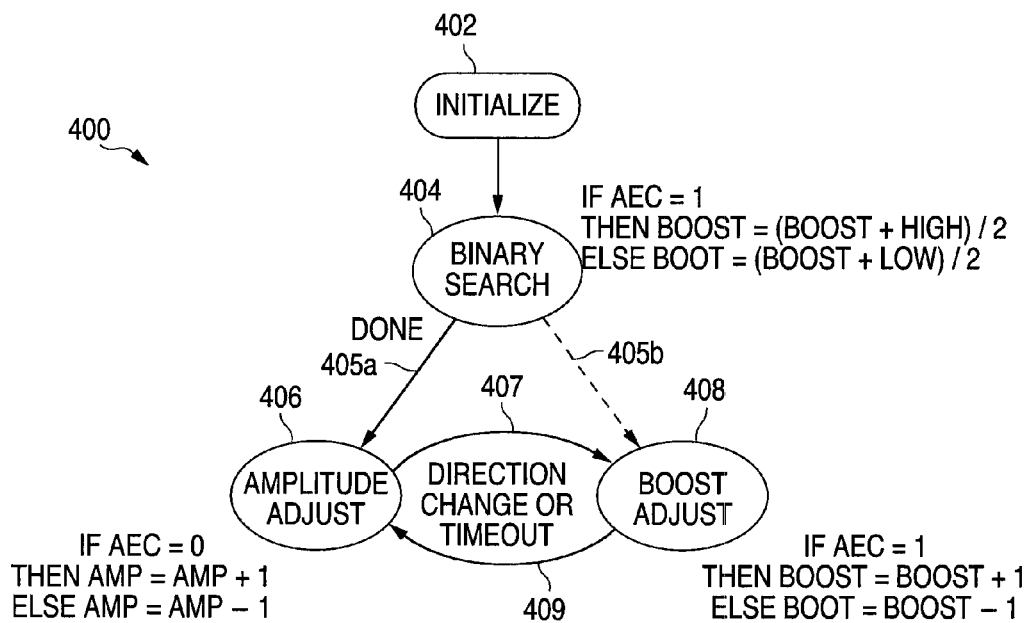
FIG. 9 is a state diagram of an exemplary embodiment of an algorithm used by the finite state machine of FIG. 8.

Referring to FIG. 9, the finite state machine 220b operates in accordance with an algorithm 400 as follows. Following initialization 402, an optimal equalizer boost is digitally selected using a binary search 404. As is well known in the art, for N programmable equalizer boost settings, it will take $\log_2$(N) search steps to find the optimal equalization boost. The state machine 202b controls the sequential resetting and integration of charge on the AEC capacitance 304 for each step in the binary search process and then updates the equalization boost, i.e., to be higher or lower. Following completion of the binary search 404, the algorithm transitions 405a to amplitude adjustment 406 with the lower bandwidths of the filters 206a, 216a, 206b, 216b in the adaptation stages 106, 116 selected. This lower bandwidth carries the amplitude information and a linear search is used for amplitude loop convergence while performing amplitude adjustment 406. The amplitudes of the output signals 105, 115 of the DC restoration and slicer stages 104, 114 are tuned to match the amplitudes of their respective equalized input signals 103, 113. This advantageously avoids the need of an AGC amplifier in the equalizer paths. The convergence of the amplitude loop is detected by a change in direction of the amplitude code 407, following which the state machine 220b transitions 407 to boost adjustment 408 and the higher bandwidths of the band pass filters 206a/216a, 206b/216b in the adaptation stages 106/116 are selected. The finite state machine 220b then begins linear equalization boost adjustment 408. A change in direction or timeout in the equalization boost loop causes the state machine 220b to transition back 409 to amplitude adjustment 406.

In accordance with an alternative embodiment, following completion of the binary search 404, the algorithm can instead first transition 405b to boost adjustment 408, with the higher bandwidths of the filters 206a, 216a, 206b, 216b in the adaptation stages 106, 116 selected.

Upon convergence, the average value of the voltage across the AEC capacitance 304 (FIG. 7) will be zero for both amplitude (low bandwidth) and equalization boost (high bandwidth) frequency bands of the band pass filters 206a/216a, 206b/216b. The state machine 220b will toggle back and forth 407, 409 between adjacent amplitude and equalization boost settings that are finely spaced.

Figure 10:
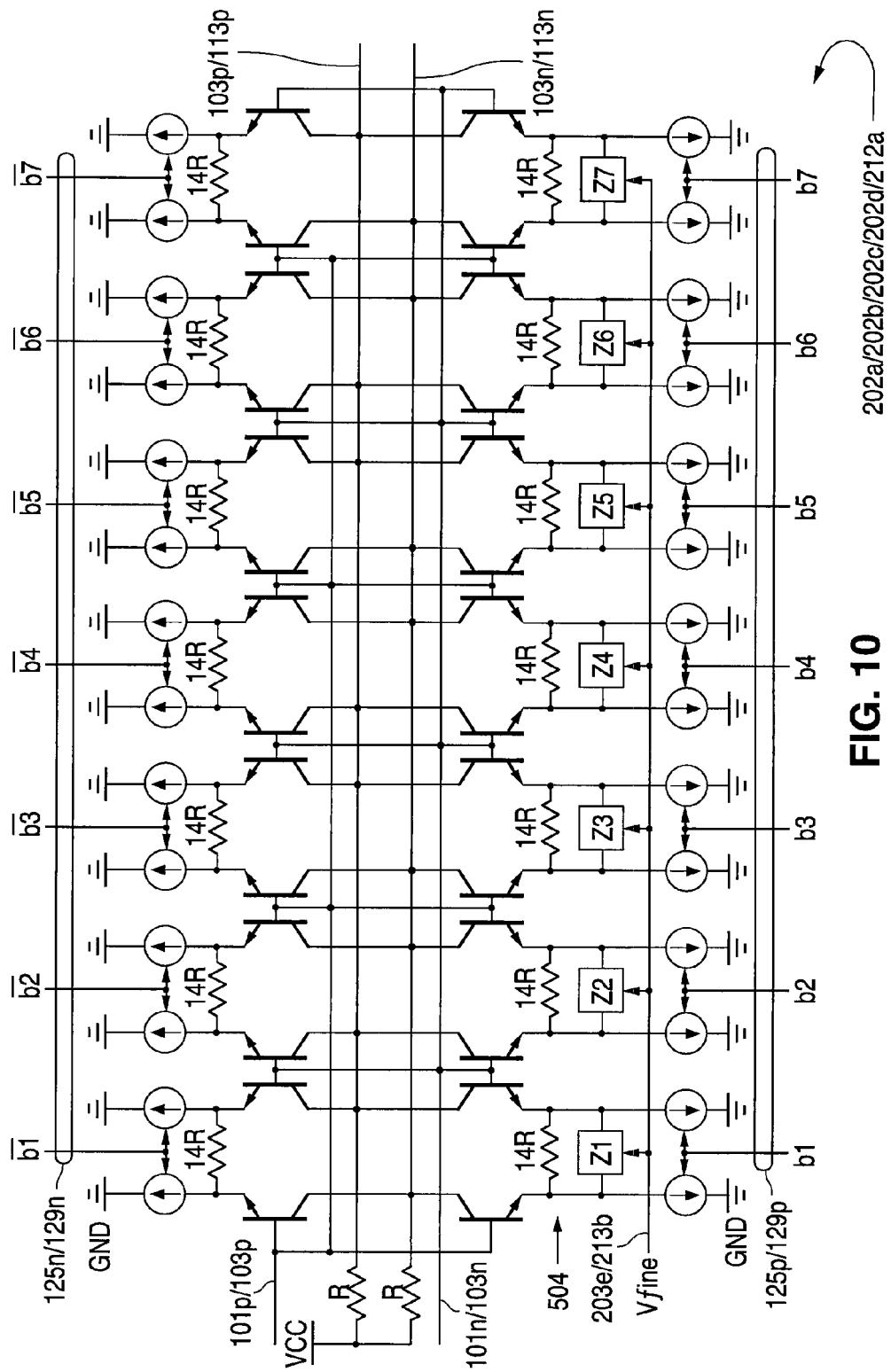
FIG. 10 is a schematic diagram of an exemplary embodiment of the equalization circuits of FIGS. 2 and 3.

Referring to FIG. 10, an exemplary embodiment of the equalizer circuits 202a, 202b, 202c, 202d, 212a of the high rate filter 102 and low rate filter 112 (FIGS. 2 and 3) include multiple stages of parallel-connected DC amplifiers 502 and AC amplifiers 504 for receiving the positive 101p/103p and negative 101n/103n phases of the differential input signal 101, and providing the positive 103p/113p and negative 103n/113n signal phases of the output signals 103/113 which have been equalized as discussed above. The amplifiers 502, 504 are biased from a power supply VCC through resistors having a value R. Both the DC 502 and AC 504 amplifiers use differentially coupled NPN bipolar junction transistors with emitter degeneration resistances having a value 14R and bias current sources as shown. (It should be noted that this circuitry of FIG. 10 includes seven differential amplifiers stages, reflecting the seven stages used by the low rate equalizer circuit 212. For each of the high rate equalizer circuits, 202a, 202b, 202c, 202d, six amplifiers stages are used and the emitter degeneration resistances have a common value of 12R.) The AC amplifiers 504 also include tunable impedances Z1, Z2, Z3, Z4, Z5, Z6, Z7 (Z1-Z6 for the high rate equalizers), which are driven by the fine adjust voltage 203e/212b as discussed above (discussed in more detail below). The bias current sources of the AC amplifiers 504 are controlled in accordance with the thermometer code represented by the bits b1, b2, b3, b4, b5, b6, b7 (bits b1-b6 for the high rate equalizers) of the coarse control signals 125/129, while the bias current sources of the DC amplifiers 502 are driven by the inverses of such bits.

Figure 11:
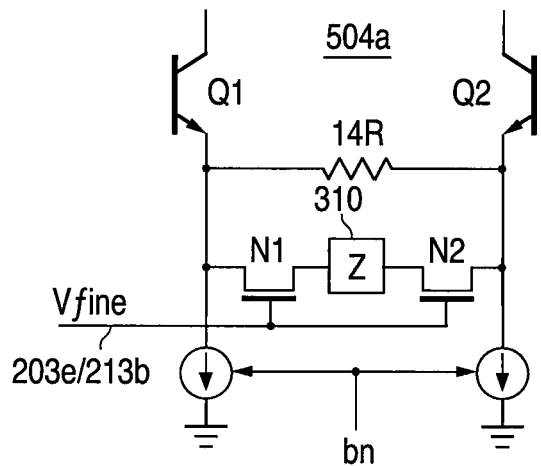
FIG. 11 is a partial schematic diagram of an exemplary embodiment of an AC portion of the equalization circuit stages of FIG. 10.

Referring to FIG. 11, an exemplary embodiment 504*a* of the AC amplifiers 504 include a tunable impedance implemented as an impedance 310 coupled between N-type metal oxide field effect transistors (N-MOSFETs) N1, N2, the gate electrodes of which are driven by the fine control voltage 203*e*/212*b*. With the transistors N1, N2 operating in their linear operating regions, a fine boost vernier control is provided, with step-wise linearity (discussed in more detail below). The impedance 310 can be implemented as virtually any form of impedance, such as a combination of one or more additional resistances and one or more capacitances. In accordance with a preferred embodiment, the impedance 310 is implemented as a capacitance. As a result, in accordance with the thermometer-coded bits bn, the gain of the equalizer circuit 202*a*/202*b*/202*c*/202*d*/212*a* (FIG. 10) will be as follows:

| b1 | b2 | b3 | b4 | b5 | b6 | b7 | Gain |
|---|---|---|---|---|---|---|---|
| 0 | 0 | 0 | 0 | 0 | 0 | 0 | 1 |
| 1 | 0 | 0 | 0 | 0 | 0 | 0 | $1 + \omega * R * C1$ |
| 1 | 1 | 0 | 0 | 0 | 0 | 0 | $1 + \omega * R * (C1 + C2)$ |
| 1 | 1 | 1 | 0 | 0 | 0 | 0 | $1 + \omega * R * (C1 + C2 + C3)$ |
| 1 | 1 | 1 | 1 | 0 | 0 | 0 | $1 + \omega * R * (C1 + C2 + C3 + C4)$ |
| 1 | 1 | 1 | 1 | 1 | 0 | 0 | $1 + \omega * R * (C1 + C2 + C3 + C4 + C5)$ |
| 1 | 1 | 1 | 1 | 1 | 1 | 0 | $1 + \omega * R * (C1 + C2 + C3 + C4 + C5 + C6)$ |
| 1 | 1 | 1 | 1 | 1 | 1 | 1 | $1 + \omega * R * (C1 + C2 + C3 + C4 + C5 + C6 + C7)$ | for $Zn = 1/(j\omega(0.5 Cn))$ and n = number of stage

Figure 12:
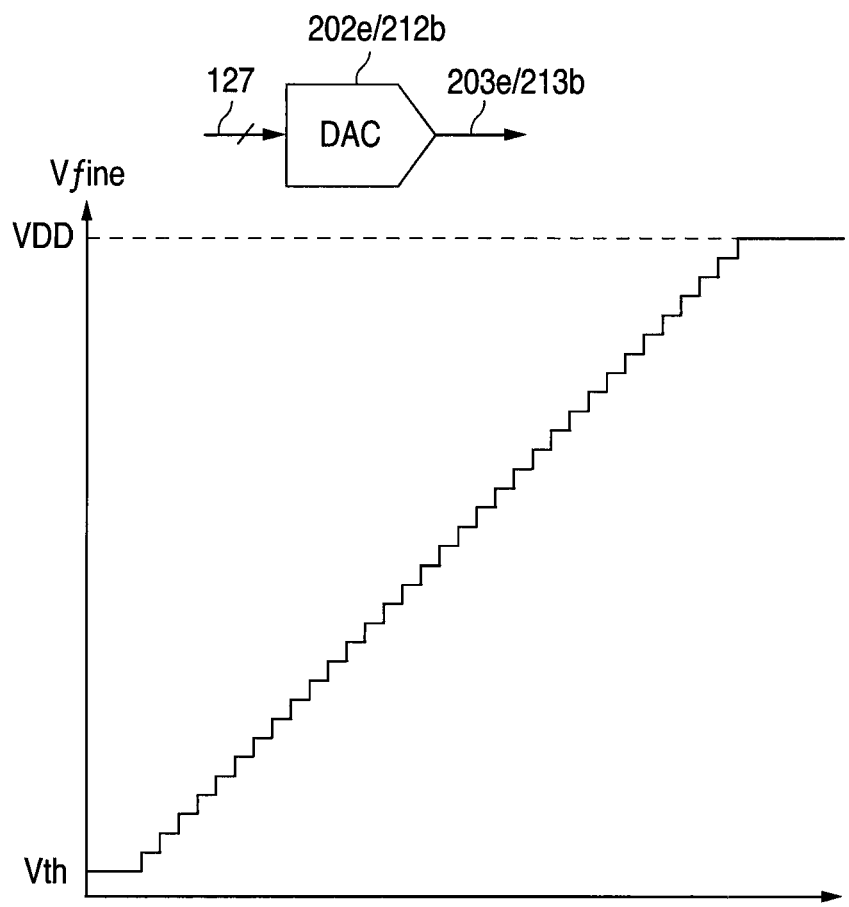
FIG. 12 is a diagram depicting an exemplary embodiment of a step-wise linear control for the fine tuning of equalization.

Referring to FIG. 12, as discussed above, the thermometer coding of the fine adjust bits provide for a step-wise linear adjustment of the equalization, with each of these 32 fine steps providing a resolution of 0.08 dB between adjacent ones of the 768 coarse steps in the high rate filter 102 and 224 coarse steps in the low rate filter 112.

Figure 13:
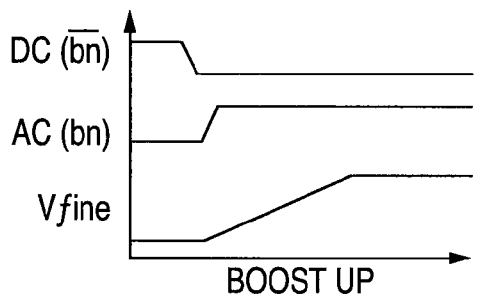
FIG. 13 is a timing diagram of an exemplary embodiment of timing for coarse and fine boost up equalization adjustments.
Figure 14:
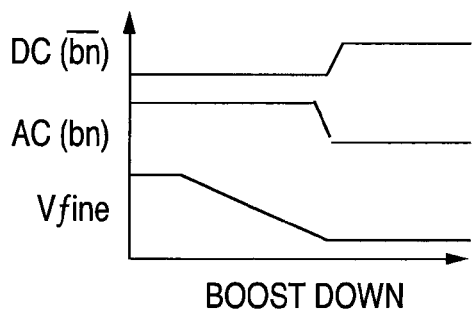
FIG. 14 is a timing diagram of an exemplary embodiment of timing for coarse and fine boost down equalization adjustments.

Referring to FIGS. 13 and 14, the timing of the adjustment of the fine control voltage and coarse tuning bits are preferably as indicated. For example, adjustment of the fine tuning voltage should only occur when the AC amplifiers 504 are enabled and the DC amplifiers 502 are disabled.

Figure 15:
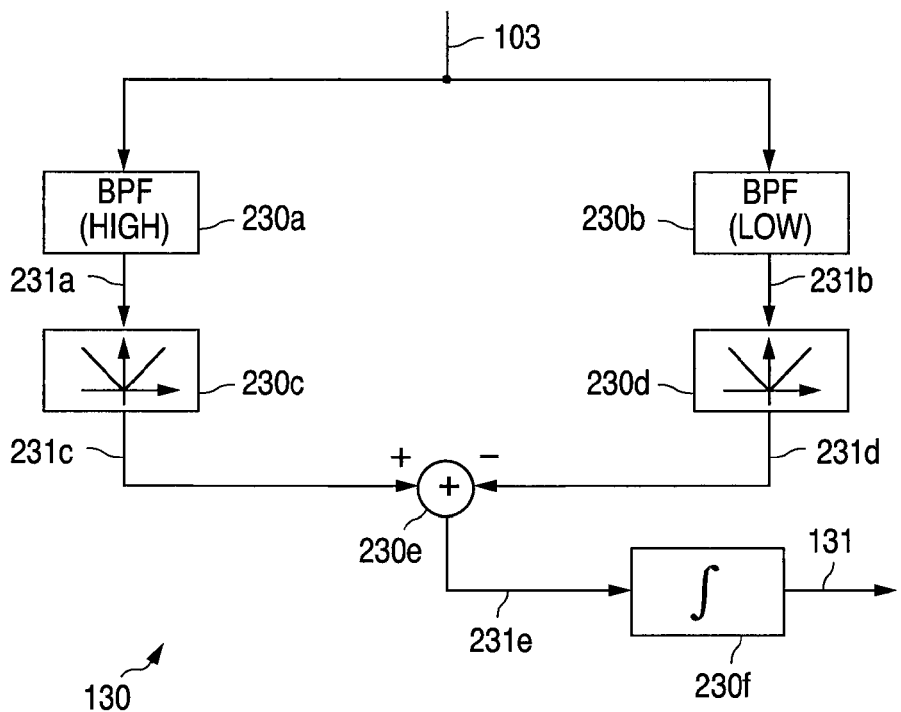
FIG. 15 is a functional block diagram of an exemplary embodiment of the rate detection stage of FIG. 1.

Referring to FIG. 15, an exemplary embodiment of the rate detection stage 130 includes a high bandwidth band pass filter 230*a*, a low bandwidth band pass filter 230*b*, full wave rectification circuits 230*c*, 230*d*, a summing circuit 230*e*, and integration circuitry 230*f*, interconnected substantially as shown, similar to the adaptation stages 106, 116 (FIG. 5). The high band pass filter 230*a* provides a filtered signal 231*a* indicative of signal energy in the high frequency band, while the low band pass filter 203*b* provides a filtered signal 231*b* indicative of energy in the low frequency band. These signals 231*a*, 231*b* are full-wave rectified by the rectification circuits 230*c*, 230*d*, and the rectified signals 231*c*, 231*d* are subtracted in the summing circuit 230*e* to produce a signal 231*e* indicating whether the high frequency band or low frequency band contains more energy. This signal 231*e* is integrated by the integration circuitry 230*f* to produce the rate detection signal 131. (In accordance with an alternative embodiment, due to their similarities, with appropriate signal switching and routing within the equalizer 100, the rate detection stage 130 can be implemented by sharing filters, rectification circuits, summing circuitry and integration circuitry with one or both of the adaptation stages 106, 116.)

Based upon the foregoing discussion, it will be understood that changes in equalization boosts will have some effect on the low frequency band that is used for amplitude control and calibration. Conversely, changes in the amplitude of the sliced signals 105, 115 will have some effect on the energy in the high frequency boost adaptation. This effectively results in two interacting loops that can potentially diverge and cause the equalization adaptation to go out of lock or convergence. However, this is avoided by operation of the finite state machine 220*b*, which uses interlaced amplitude and equalization boost loop adaptation and allows for disabling of the amplitude calibration loop. Early saturation of the amplitude calibration can be implemented to freeze the amplitude calibration loop beyond a predetermined range. Additionally, a programmable timeout from the amplitude and equalization boosts loops are different and separated in frequency. Further still, a programmable timeout from the amplitude and equalization boost loops are different and separated in frequency. Further still, a programmable timeout from the amplitude and equalization boost loops is used in case there is no toggling between the two loops for a predetermined time interval. This also ensures that the loops do not remain stuck in a sub-optimal solution.

The embodiments discussed hereinabove have been designed for implementation by National Semiconductor Corporation as integrated circuits for low power adaptive cable equalization. Copies of the preliminary data sheets for two such implementations are included as part of this disclosure (and are hereby incorporated herein by reference) in the form of Appendices A and B.

What is claimed is:

1. An apparatus including an adaptive signal equalizer for data signals with higher and lower data rates, comprising:

first signal equalization circuitry responsive to at least an incoming data signal and a first equalization control signal by selectively filtering said incoming data signal to provide a first equalized data signal with a first equalization;

second signal equalization circuitry coupled to said first signal equalization circuitry and responsive to at least said first equalized data signal and a second equalization control signal by selectively filtering said first equalized data signal to provide a second equalized data signal with a second equalization;

signal slicing circuitry coupled to said first and second signal equalization circuitries and responsive to at least said first and second equalized data signals by slicing said first and second equalized data signals to provide first and second sliced data signals; and control circuitry coupled to said first and second signal equalization circuitries and said signal slicing circuitry, and responsive to at least said first and second equalized data signals and said first and second sliced data signals by providing said at least first and second equalization control signals and selecting one of said first and second sliced data signals as an output data signal, wherein said first sliced data signal is selected as said output data signal when said incoming data signal has a data rate greater than a predetermined data rate, and said second sliced data signal is selected as said output data signal when said incoming data signal has a data rate less than said predetermined data rate, and wherein:
said first equalization comprises a first plurality of available DC-based signal boosts and a first plurality of available AC-based signal boosts;
said second equalization comprises a second plurality of available DC-based signal boosts and a second plurality of available AC-based signal boosts;
said first plurality of available DC-based signal boosts is greater than said second plurality of available DC-based signal boosts; and
said first plurality of available AC-based signal boosts is greater than said second plurality of available AC-based signal boosts.

2. The apparatus of claim 1, wherein said second equalization is lower and higher when said incoming data signal is received via a signal cable having a length less than and greater than a predetermined cable length, respectively.

3. The apparatus of claim 1, wherein said first signal equalization circuitry comprises:
a plurality of equalizing circuits responsive to said incoming data signal, said first equalization control signal and a converted equalization control signal by successively filtering said incoming data signal to provide said first equalized data signal; and
digital-to-analog conversion circuitry coupled to said plurality of equalizing circuits and responsive to another equalization control signal by providing said converted equalization control signal.

4. The apparatus of claim 1, wherein said second signal equalization circuitry comprises:
an equalizing circuit responsive to said first equalized data signal, said second equalization control signal and a converted equalization control signal by filtering said first equalized data signal to provide said second equalized data signal; and
digital-to-analog conversion circuitry coupled to said equalizing circuit and responsive to another equalization control signal by providing said converted equalization control signal.

5. The apparatus of claim 1, wherein said signal slicing circuitry comprises:
a first signal slicing circuit responsive to at least said first equalized data signal by slicing said first equalized data signal to provide said first sliced data signal; and
a second signal slicing circuit responsive to at least said second equalized data signal by slicing said second equalized data signal to provide said second sliced data signal.

6. The apparatus of claim 1, wherein said control circuitry comprises:
adaptation circuitry responsive to at least said first and second equalized data signals by providing at least first and second feedback signals; and
controller circuitry coupled to said adaptation circuitry and responsive to at least said at least first and second feedback signals by providing said at least first and second equalization control signals.

7. The apparatus of claim 1, wherein said control circuitry comprises:
data rate detection circuitry responsive to said first equalized data signal by providing a data rate detection signal indicative of said data rate of said incoming data signal;
adaptation circuitry responsive to at least said first and second equalized data signals by providing at least first and second feedback signals; and
controller circuitry coupled to data rate detection circuitry and said adaptation circuitry, and responsive to at least said data rate detection signal and said at least first and second feedback signals by providing said at least first and second equalization control signals.

8. The apparatus of claim 1, wherein said control circuitry comprises:
data rate detection circuitry responsive to said first equalized data signal by providing a data rate detection signal indicative of said data rate of said incoming data signal;
signal selection circuitry responsive to said first and second sliced data signals and said data rate detection signal by selecting one of said first and second sliced data signals as an output data signal;
adaptation circuitry responsive to at least said first and second equalized data signals by providing at least first and second feedback signals; and
controller circuitry coupled to data rate detection circuitry and said adaptation circuitry, and responsive to at least said data rate detection signal and said at least first and second feedback signals by providing said at least first and second equalization control signals.

9. The apparatus of claim 1, wherein:
said first equalization comprises a first plurality of available signal boosts;
said second equalization comprises a second plurality of available signal boosts; and
said first plurality of available signal boosts is greater than said second plurality of available signal boosts.

10. A method for adaptively equalizing data signals with higher and lower data rates,
comprising:
responding to at least a first equalization control signal by selectively filtering an incoming data signal to provide a first equalized data signal with a first equalization;
responding to at least a second equalization control signal by selectively filtering said first equalized data signal to provide a second equalized data signal with a second equalization;
slicing said first and second equalized data signals to provide first and second sliced data signals; and
responding to at least said first and second equalized data signals and said first and second sliced data signals by providing said at least first and second equalization control signals and selecting one of said first and second sliced data signals as an output data signal,
wherein
said first sliced data signal is selected as said output data signal when said incoming data signal has a data rate greater than a predetermined data rate, and
said second sliced data signal is selected as said output data signal when said incoming data signal has a data rate less than said predetermined data rate, and
wherein:
said first equalization comprises a first plurality of available DC-based signal boosts and a first plurality of available AC-based signal boosts;
said second equalization comprises a second plurality of available DC-based signal boosts and a second plurality of available AC-based signal boosts;
said first plurality of available DC-based signal boosts is greater than said second plurality of available DC-based signal boosts; and
said first plurality of available AC-based signal boosts is greater than said second plurality of available AC-based signal boosts.

11. The method of claim 10, wherein said second equalization is lower and higher when said incoming data signal is received via a signal cable having a length less than and greater than a predetermined cable length, respectively.

12. The method of claim 10, wherein said responding to at least a first equalization control signal by selectively filtering an incoming data signal to provide a first equalized data signal with a first equalization comprises:
   responding to said first equalization control signal and an analog equalization control signal by successively filtering said incoming data signal to provide said first equalized data signal; and
   responding to a digital equalization control signal by providing said analog equalization control signal.

13. The method of claim 10, wherein said responding to at least a second equalization control signal by selectively filtering said first equalized data signal to provide a second equalized data signal with a second equalization comprises:
   responding to said second equalization control signal and an analog equalization control signal by filtering said first equalized data signal to provide said second equalized data signal; and
   responding to a digital equalization control signal by providing said analog equalization control signal.

14. The method of claim 10, wherein said slicing said first and second equalized data signals to provide first and second sliced data signals comprises:
   slicing said first equalized data signal to provide said first sliced data signal; and
   slicing said second equalized data signal to provide said second sliced data signal.

15. The method of claim 10, wherein said responding to at least said first and second equalized data signals and said first and second sliced data signals by providing said at least first and second equalization control signals and selecting one of said first and second sliced data signals as an output data signal comprises:
   responding adaptively to at least said first and second equalized data signals by providing at least first and second feedback signals; and
   responding to at least said at least first and second feedback signals by providing said at least first and second equalization control signals.

16. The method of claim 10, wherein said responding to at least said first and second equalized data signals and said first and second sliced data signals by providing said at least first and second equalization control signals and selecting one of said first and second sliced data signals as an output data signal comprises:
   responding to said first equalized data signal by providing a data rate detection signal indicative of said data rate of said incoming data signal;
   responding adaptively to at least said first and second equalized data signals by providing at least first and second feedback signals; and
   responding to at least said data rate detection signal and said at least first and second feedback signals by providing said at least first and second equalization control signals.

17. The method of claim 10, wherein said responding to at least said first and second equalized data signals and said first and second sliced data signals by providing said at least first and second equalization control signals and selecting one of said first and second sliced data signals as an output data signal comprises:
   responding to said first equalized data signal by providing a data rate detection signal indicative of said data rate of said incoming data signal;
   responding to said data rate detection signal by selecting one of said first and second sliced data signals as said output data signal;
   responding adaptively to at least said first and second equalized data signals by providing at least first and second feedback signals; and
   responding to at least said data rate detection signal and said at least first and second feedback signals by providing said at least first and second equalization control signals.

18. The method of claim 10, wherein:
said first equalization comprises a first plurality of available signal boosts;
said second equalization comprises a second plurality of available signal boosts; and
said first plurality of available signal boosts is greater than said second plurality of available signal boosts.

* * * * *